June 18, 1957  P. E. BESSIERE  2,796,541
FOUCAULT CURRENT APPARATUS AND IN PARTICULAR
IN BRAKING DEVICES OF THIS TYPE
Filed Dec. 17, 1954  2 Sheets-Sheet 1
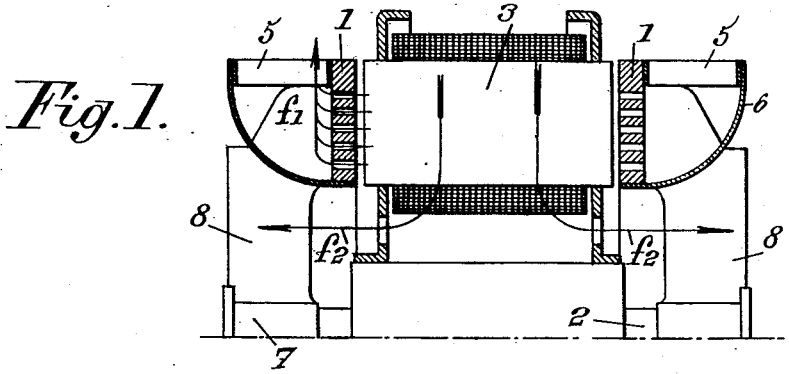
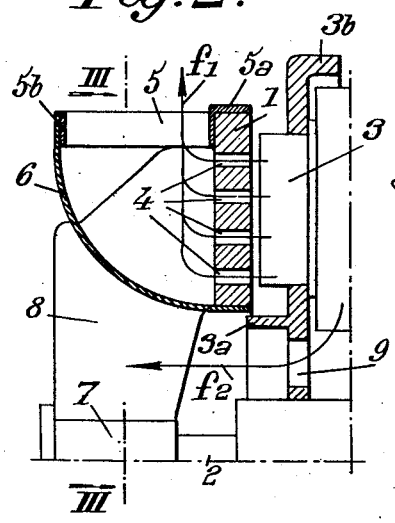
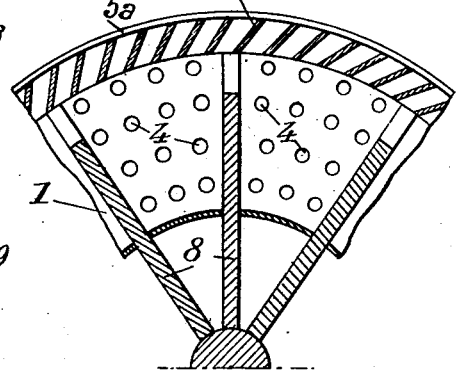
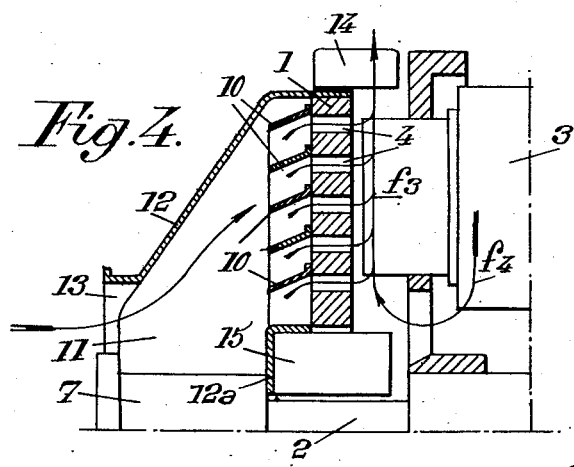
INVENTOR
Pierre Etienne Bessiere
BY
Bailey, Stephens and Huettig
ATTORNEYS INVENTOR
Pierre Etienne Bessiere
BY
Bailey, Stephens and Huettig
ATTORNEYS

United States Patent Office 2,796,541
Patented June 18, 1957

2,796,541

FOUCAULT CURRENT APPARATUS AND IN PARTICULAR IN BRAKING DEVICES OF THIS TYPE

Pierre Etienne Bessière, Paris, France, assignor to Compagnie Telma, Paris, France, a society of France Application December 17, 1954, Serial No. 476,045

Claims priority, application France December 21, 1953

6 Claims. (Cl. 310—93)

The present invention relates to Foucault current apparatus including two parallel discs of a magnetic material fixed to the shaft of the apparatus and rotating in a magnetic field produced by an electro-magnetic inductor system located between said rotating discs and which creates Foucault currents therein, when they are rotating. The rotating discs form the rotor of the apparatus, whereas the inductor system constitutes its stator.

The present invention relates more especially but not exclusively to apparatus of this kind acting as slowing down or braking devices for a vehicle, a hoisting gear, a sounding device for mines, etc.

The object of my invention is to provide an apparatus of this kind which is better adapted to meet the requirements of practice than those existing up to this time and in particular where cooling of the rotating disc or discs in which Foucault currents are produced is achieved in a simple and very efficient manner.

Preferred embodiments of my invention will be hereinafter described with reference to the accompanying drawings, given merely by way of example and in which:

Fig. 1 is a diagrammatic axial half-section of a braking device made according to a first embodiment of my invention.

Fig. 2 is a view on an enlarged scale of a portion of a braking device similar to that of Fig. 1 but slightly different therefrom.

Fig. 3 is a section on the line III—III of Fig. 2.

Fig. 4 is a view similar to that of Fig. 2, showing another embodiment of the invention.

Figure 5:
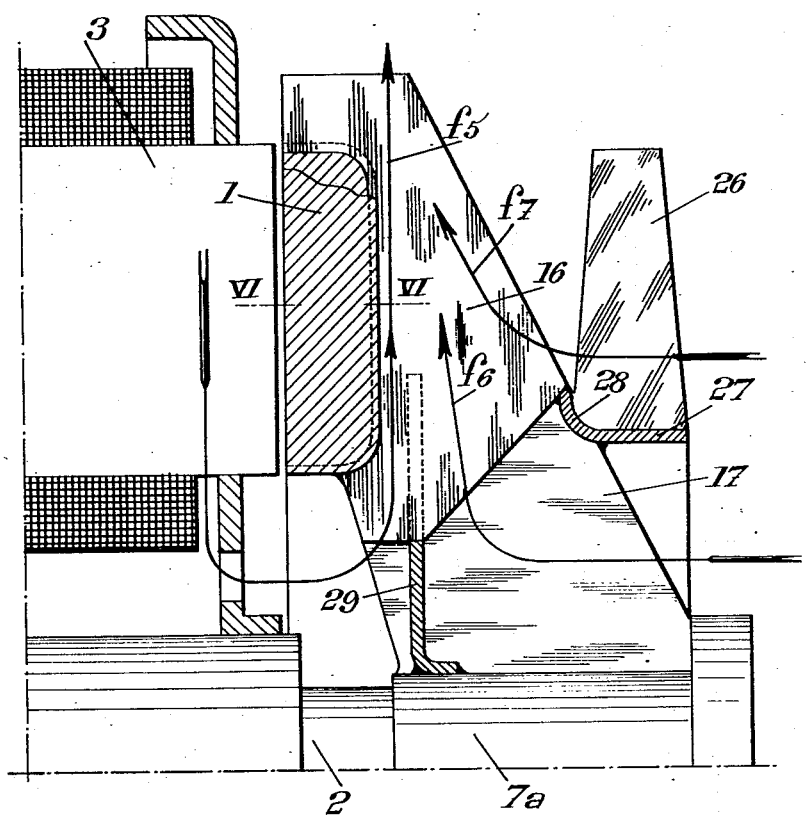
Fig. 5 is a diagrammatic axial half-section on an enlarged scale of a braking device made according to another embodiment of the invention.

This braking or slowing down device includes a rotor essentially constituted by two discs 1 of a magnetic material rigid with a shaft 2 which is connected with the part to be braked and a fixed homopolar or heteropolar electro-magnetic inductor system located in the space between the discs 1 of the rotor. When this inductor system is energized by the passage of an electric current therethrough, it creates a magnetic field which closes through the rotating discs 1 and thus produces Foucault currents in these discs. The discs are thus subjected to a braking action and also to considerable heating. It is therefore necessary to cool down these discs so as to dissipate into the atmosphere the heat created in the discs by the Foucault currents.

For this purpose, according to a feature of my invention, I provide in each of the discs 1 holes or passages 4 which extend throughout the disc. On the outer face of the disc, that is to say on the other side thereof from the inductor system 3 and close to the periphery of the disc, I provide a multiplicity of thin and narrow fan blades 5 having their longer dimension parallel to shaft 2. The smaller dimension of these blades 5 is small as compared with the outer radius of disc 1, but the longer dimension is large, for instance of the same order of magnitude as the difference between the outer and inner radii of said disc 1. These blades, which may be radial but are preferably inclined with respect to the corresponding radial planes (see Fig. 3) are connected together at their ends by transverse elements 5a and 5b respectively. The inner element 5a is fixed to the corresponding disc 1 in suitable fashion, for instance by welding, riveting, screwing, and may have an L-shaped section (Fig. 2). The outer element 5b is carried by an annular partition 6 preferably having a circular sector shaped section by a plane passing through the shaft axis so as to surround holes 4, ending for instance on the inner periphery of annular disc 1, as shown by Figs. 1 and 2. Disc 1 is fixed to a hub 7 carried by shaft 2 through a plurality of radial arms 8 extending through slots provided in partition 6 and which have a fan effect.

Blades 5 constitute a fan system which sucks in a large amount of air through holes 4 as shown on Figs. 1 and 2 by arrows $f_1$ thus efficiently cooling disc 1. The air drawn by blades 5, before entering the holes 4 of disc 1, has already passed along a portion of the inductor system 3 and therefore cooled this system. This cooling action is completed by the action of fan blades 8 which cause air to flow through holes 9 in the direction indicated by arrows $f_2$.

In order to prevent the portion of the cooling air stream which is to flow through the holes 4 of disc 1, as indicated by arrows $f_1$, from mixing with the air stream flowing in the direction of arrows $f_2$, it is advantageous, as shown by Fig. 2, to provide an annular cylindrical flange 3a carried by the support 3b of inductor system 3, this flange 3a extending coaxially to shaft 2 into the vicinity of the inner periphery of annular disc 1.

According to another feature of my invention, illustrated by Fig. 4 which relates to another embodiment where each of the discs 1 is also provided with a multiplicity of holes or passages 4 extending throughout said disc, these holes or passages being disposed in several circular concentric rows, the outer face of each disc 1 carries, between each row of holes 4 and even around the external row of holes, concentric guiding surfaces 10 of general conical shape. These guiding surfaces direct toward every row of holes 4 the air streams impelled by the blades 11 of a centrifugal fan mounted on the hub 7 of each disc 1. Said blades 11 constitute the arms which carry said disc 1. The outer edges of blades 11 are surrounded by a partition 12 leaving near hub 7 a central air inlet opening 13. The inner periphery of disc 1 carries a partition 12a of L-shaped cross section. I further provide on the periphery of disc 1 a plurality of blades 14 which extend across the outer periphery of disc 1 and beyond the inner face of said disc toward the stator. When the disc is rotating, these blades 14 draw out the air flowing through passages 4. Preferably, near shaft 2 and partition 12a and inside the inner periphery of annular disc 1, I further provide a helical fan 15.

When shaft 2 and the rotor, that is to say discs 1, are rotating, blades 11 suck in air from the outside through opening 13 and force it along guiding surfaces 10 toward the concentric rows of holes 4. This air flows through said holes 4 and is sucked out by blades 14, being expelled radially into the atmosphere after it has cooled disc 1. The path of these air streams is shown in Fig. 4 by arrows $f_3$.

An auxiliary air stream indicated by arrow $f_4$ is produced by helical fan 15. This second air stream passes through the inside of the apparatus so as to cool the windings of the inductor system. This last mentioned air stream is then expelled into the atmosphere under the effect of blades 14.

In the construction illustrated by Figs. 1 to 4, discs 1 are relatively thick so that holes or passages 4 have a relatively large inner cylindrical area, which further increases their efficiency for cooling down the disc.

Figure 6:
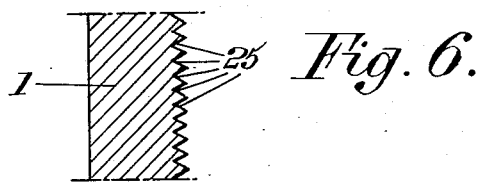
Fig. 6 is a part section on the line VI—VI of Fig. 5.

In the construction illustrated by Figs. 5 and 6, the outer face of disc 1 carries a multiplicity of blades 16 and 17 of substantially radial arrangement. This blade system not only increases the cooling area but also constitutes a centrifugal fan. Blades 17 extend inwardly as far as a common hub 7a fixed on shaft 2 so that said blades 17 constitute radial arms connecting disc 1 to said shaft 2. In order further to increase the area of contact with cooling air, I advantageously provide in the outer face of disc 1 radial grooves 25 (Fig. 6) or the like.

If the radial channels formed between centrifugal fan blades 16 and 17 were closed by an outer partition or casing allowing air to flow in only in the vicinity of shaft 2 and to escape only at the periphery, I would obtain a satisfactory guiding of the cooling air along the outer face of disc 1, but I would prevent the possibility of cooling the disc by radiation of heat from blades 16 and 17.

In order to avoid this drawback, according to my invention, I combine with the centrifugal fan formed by blades 16 and 17 at least one axial fan cooperating in such manner with said centrifugal fan that the radial and centrifugal air flow created by the centrifugal fan is caused by the action of the axial fan to flow along the external face of disc 1.

In other words, such an axial fan will play the same part as the above mentioned partition or casing which can therefore be dispensed with. The hot surfaces, and in particular the outer face of disc 1, can then freely evacuate heat by radiation, owing to the absence of such a partition or casing which would prevent this radiation.

Advantageously, the axial fan is constituted by helical-shaped blades 26 rigid with a hub 27, preferably of tubular shape, provided on the outer edges of blades 16 and 17 and concentric with hub 7. Hub 27 may be fixed by welding on the outer edges of blades 16 and 17. Advantageously, the inner edge 28 of hub 27 is flaring outwardly so as to facilitate the flow of the air stream.

In an apparatus as above described, when the rotor is running, cooling air streams are produced as illustrated by arrows $f_5$ and $f_6$. The air stream along arrow $f_5$ is sucked in by the centrifugal fans 16—17 toward the axis of the braking device. It first cools down the inductor system 3, passes through the free annular space existing between the inner periphery of disc 1 and shaft 2 and then turns at 180° so as to escape to the atmosphere in an outward direction after flowing along the outer face of disc 1 and blades 16 and 17. The air stream along arrow $f_6$ flows inside hub 27 and serves chiefly to cool down the hub and the rotor bearings. A supplementary air stream, indicated by arrow $f_7$, passes on the outside of hub 27.

In order to obtain a better guiding against the outer face of disc 1 of the air stream indicated by arrow $f_5$, and to prevent it from interfering with the air stream indicated by arrow $f_6$, it is advantageous to provide a screen or partition 29 of general annular shape and transverse to the axis of shaft 2, this partition starting from said shaft and extending outwardly in a plane located on the outside of the outer face of disc 1. This partition 29 may be welded to hub 7 and is provided with slots for the passage of blades 16 and 17. Of course, the outer diameter of partition 29 must be such that it does not interfere with the heat radiation from disc 1.

The whole of disc 1 and the fans above mentioned may be made of elements which are separately machined and assembled together by welding. It may also be constituted by a single piece obtained by casting.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A Foucault current apparatus comprising a frame, a shaft journalled in said frame, two discs of a magnetic material fixed to said shaft coaxially therewith, electromagnetic inductor means fixed to said frame between said discs to produce, when said discs are rotating, Foucault currents therein, a set of fan blades of elongated shape carried by each of said discs on the outer side thereof along its outer periphery, the longer sides of said fan blades extending in at least substantially the same direction as said shaft, each of said discs being provided in an annular zone thereof with a plurality of holes extending from one face thereof to the opposite face, and an annular curved wall carried by each of said discs and extending between the outer edges of said fan blades and the inner limit of said annular zone of said disc.

2. A Foucault current apparatus comprising a frame, a shaft journalled in said frame, two annular discs of a magnetic material fixed to said shaft coaxially therewith, electro-magnetic inductor means fixed to said frame between said discs to produce, when said discs are rotating, Foucault currents therein, a set of fan blades of elongated shape carried by each of said discs on the outer side thereof along its outer periphery, the longer sides of said fan blades extending in at least substantially the same direction as said shaft, each of said discs being provided in an annular zone thereof with a plurality of holes extending from one face thereof to the opposite face, and an annular curved wall carried by each of said discs and extending between the outer edges of said fan blades and the inner periphery of said annular disc.

3. An apparatus according to claim 1 including disc-shaped supports coaxially surrounding said shaft and connected to said frame for supporting said inductor means, said supports being provided with annular passages close to said shaft and cylindrical partitions carried by said supports on the outer faces thereof and extending close to the inner periphery of said first mentioned disc so as to separate said annular passages from said holes.

4. A Foucault current apparatus comprising a frame, a shaft journalled in said frame, two discs of a magnetic material fixed to said shaft coaxially therewith, each of said discs being provided, in an annular zone thereof, with holes extending from one face thereof to the opposite face and forming a plurality of concentric annular rows, electromagnetic inductor means fixed to said frame between said discs to produce, when said discs are rotating, Foucault currents therein, a plurality of concentric guide walls concentrically surrounding at least some of said rows of holes and fixed to the outer face of each of said discs, said guide walls being of substantially frusto-conical shape inclined toward the axis of said shaft in the direction away from said disc, and a casing extending around said guide walls, from the outer periphery of said disc toward said shaft, said casing forming at its end remote from said shaft a central air inlet opening coaxial with said shaft.

5. A Foucault current apparatus comprising a frame, a shaft journalled in said frame, two annular discs of a magnetic material fixed to said shaft coaxially therewith, electro-magnetic inductor means fixed to said frame between said discs to produce, when said discs are rotating, Foucault currents therein, a multiplicity of radial blades carried by the outer face of each of said discs arranged to form a centrifugal fan along said face, blades carried by said shaft on the outer sides of said discs and at a distance therefrom, said last mentioned blades being arranged to form an axial fan forcing the radial air stream formed by said centrifugal fan to flow along said outer faces of said discs and disc-shaped deflector partitions carried by said shaft at right angles thereto on the outer sides of said discs and at a small distance from their outer faces.

6. A Foucault current apparatus comprising a frame, a shaft journalled in said frame, two discs of a magnetic material fixed to said shaft coaxially therewith, each of said discs being provided in an annular zone thereof coaxial with said shaft with a multiplicity of holes extending from one face of said disc to the opposite face, electro-magnetic inductor means fixed to said frame between said discs to produce, when said discs are rotating, Foucault currents therein, centrifugal fan blades carried by each of said discs on the outer face thereof, and partition means carried by said shaft at a distance of said disc on the outer sides thereof for preventing air from the outside from flowing through said holes toward said inductor means.

References Cited in the file of this patent
UNITED STATES PATENTS

| | | |
|---|---|---|
| 2,630,466 | Landis | Mar. 3, 1953 |

FOREIGN PATENTS

| | | |
|---|---|---|
| 1,005,416 | France | Dec. 19, 1951 |